Jan. 4, 1966 M. G. DREYFUS 3,227,877
COOLED INFRARED DETECTOR SYSTEM WITH MEANS TO ELIMINATE
RADIATION FROM THE INSTRUMENT ITSELF
Filed Jan. 30, 1963
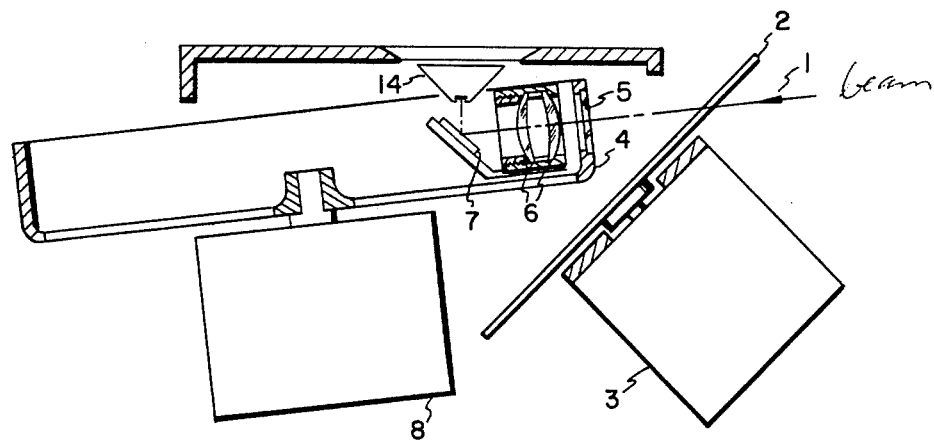
FIG. 1
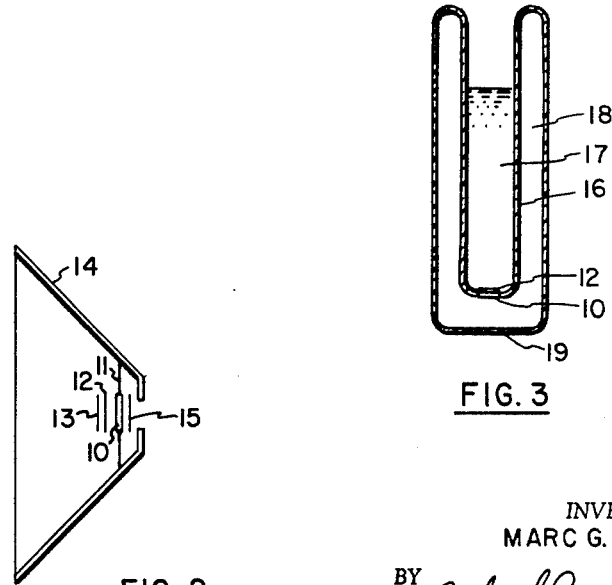
FIG. 2
FIG. 3
INVENTOR.
MARC G. DREYFUS
BY
ATTORNEY

3,227,877
COOLED INFRARED DETECTOR SYSTEM WITH MEANS TO ELIMINATE RADIATION FROM THE INSTRUMENT ITSELF
Marc G. Dreyfus, Stamford, Conn., assignor to Barnes Engineering Company, Stamford, Conn., a corporation of Delaware
Filed Jan. 30, 1963, Ser. No. 255,007
10 Claims. (Cl. 250—83.3)

This invention relates to an improved cooled detector for infrared radiometers.

The problem of infrared radiometers responding to low level, relatively long range infrared radiation is a formidable one. The amount of energy available is usually very small, and similarly detectors which are useful at room temperature, such as thermistors and thermocouples, have relatively low sensitivity and, in the case of thermistors, also a relatively long time constant.

It would be desirable if photoconductors or photovoltaic detectors could be used, such as leads sulfide, lead selenide, indium antimonide and the like. Unfortunately at room temperatures these detectors are not sensitive to long wave infrared radiation, and therefore could not be used. When these detectors are strongly cooled, for example by liquid nitrogen, and even in some cases by liquid helium, their sensitivity to long wave infrared radiation increases to the point where they are useful. In fact, certain detectors, such as for example, copper or other doped germanium detectors, when strongly cooled extend for a long way in the infrared out to $20\mu$ or more.

Radiometers have been built with the detector in a cryostat which have achieved practical success. However, this in turn has raised problems for certain uses because if the radiometer is to be operated for long periods of time, such as instruments in satellites and the like, it is impractical to provide cooling by means of liquified gases. It has also been proposed to cool by using the Peltier effect, but this in turn requires a considerable amount of electric power, which is also a serious problem especially in satellites. As a result there has been no practical way of using cooled radation detectors for uses where the heavy or power consuming cryostats are not practically useful. It is with the solution of this problem that the present invention is particularly concerned.

In its broadest aspects the present invention provides a cooled detector system which does not absorb radiation strongly in the portion of the spectrum radiated by the instrument body itself. For this radiation the detector may be considered as being substantially transparent or reflecting. One can visualize in infrared terms the instrument body, which is normally at approximately 300° K., as a furnace glowing quite brightly in the long wave infrared. The detector of the present invention is designed not to absorb sufficient quantities of these radiations to heat it up greatly and very efficient cooling is thus made possible. The problem is not as serious with a liquid nitrogen or liquid helium cooled detectors as with a detector for use in satellites where the weight and power requirements of a liquid cooling system are prohibitive. Nevertheless even with liquid cooled detectors it is an advantage to keep the detector from heating up from radiations of the instrument itself. Thus in a broader aspect the present invention includes detectors which are liquid cooled.

In the case of satellites where the power and weight requirements of a liquid cooling cryostat are prohibitive, the present invention can be used with even greater advantage and this is the most important single field for utilization of the invention and so, in a more specific aspect, constitutes a very important modification.

A satellite or other space vehicle can utilize radiation cooling by radiating the heat from a specially designed, and radiation shielded, detector package to outer space. Outer space has a temperature but a very few degrees above absolute zero and by radiation to outer space the present invention permits cooling the detector down to temperatures of from —70 to —100° C. or even colder. At the same time the cooling does not involve significant additional weight and does not consume any power.

The essential parts of the present invention involve the following elements: A detector sensitive to shorter wave infrared and preferably transparent to longer wave infrared, suitable mechanical support for the detector which is, or includes, an insulating means transparent to short wave infrared and reflecting long wave infrared and cooling means for the detector system in heat conducting relation to the detector.

Three general arrangements of elements are practical. The first involves a dichroic reflector in the beam of infrared radiation which is directed at the detector, the filter being transparent for short wave infrared and reflecting long wave infrared and, if in contact with the detector, being an insulator or having an insulating layer. Infrared radiation passing through the filter is separated into short wave and long wave the short wave striking the detector and the long wave being reflected away. The detector is mechanically supported and means are provided for cooling the detector package.

The second modification arranges the detector to receive infrared radiation directly, overlying a reflecting surface, either insulating or provided with a thin insulating layer, mechanical support for the system and cooling means.

The third arrangement which is by far the most satisfactory under present conditions in the art and is applicable either to detectors cooled by radiation to a cold body such as outer space or to a liquid cooled detector involves mounting the fragile sensitive detector on a layer or substrate of material which is transparent to the long wave infrared primarily radiated by the instrument body.

This layer or substrate is backed by an efficient infrared mirror, the back of which is blackened or otherwise transformed into a surface of high emissivity and is directed to outer space using a mirrored cone or other catoptric means to increase its radiation to the cold sink and prevent radiation exchange with the instrument housing. The cone or other device, which has a mirrored internal surface, thus is acting as a heat radiation baffle and director of the radiation, both functions being performed at the same time.

The present invention should not be confused with a different, and for many purposes less satisfactory, arrangement which provides a large cooled surface or mass and a very small detector. No attempt is made to prevent the detector from being heated up by long wave radiation but its mass is so small in comparison to the large cooled support that it is possible to produce a fairly satisfactory cooled detector system. It should be noted that the system while it is useful lacks the feature of the present invention that the detector is substantially not heated at all by long wave infrared and, therefore, it is not necessary to provide for a large excess of cooling. Also changes in the amount of long wave infrared radiation will not alter the final detector package temperature. Detector systems which depend on a large cooled mass with a small detector which is not shielded or otherwise prevented from receiving heat by long wave infrared are not included in the present invention. The invention even in its broadest aspects, includes as an essential characteristic, that the long wave radiation is reflected away from the detector or other portions of the detector system which could be heated up.

The specific aspect of the present invention which utilizes a layer or substrate that is transparent to the long wave infrared operates because it has been found that photodectors absorb energy in the short wave radiation bands to which they are sensitive at room temperature, and are relatively transparent for longer wave infrared. This relative transparency has not been utilized in the past or its significance appreciated. The detector transparency is one of the important factors which make the present invention possible. Thus the detector itself is not significantly heated up and so contributes but little to the final temperature equilibrium obtained by the radiation cooling achieved by the present invention. At this point it is desirable to define what we mean by the longer wave infrared. Photodetectors such as P$b$S and P$b$Se respond at room temperature to the shorter wavelength infrared, cutting off at points from 3 to 6$\mu$. On the other hand, the radiations from a 300° K. instrument peak somewhere around 10$\mu$ and radiate a large portion of their energy in the still longer wavelengths. Thus, in the present invention infrared from about 8$\mu$ on is considered longer wave infrared as compared to the near infrared to which the photodetectors are sensitive at room temperature.

The instruments are often required to respond to fairly long wave infrared radiation and it might be supposed that if we have a photodetector cooled to the point where it responds to longer wave infrared, for example 8$\mu$ on, that the detector would also respond to radiations from the instrument directly. However, it is to be noted that there are radiation gathering optics in a radiometer so that the radiations coming from outside of the instrument and to which it is to respond are concentrated to a very great degree on the detector itself which is extremely small in size.

Another factor which must be taken into consideration is that the detector, infrared transparent layer, mirror and black radiating surface must not receive significant amounts of heat by conduction from the instrument itself. This requires a mounting which does not conduct thermally effectively, for example mounting on fibers of plastics. Such mountings are not new concepts but are utilized in the present invention in order to achieve good thermal insulation of the detector complex from the walls of the instrument.

In the general description above of the modification of the invention in which radiation cooling is employed the mirror is blackened on the side toward the cold body or space toward which the radiation takes place. In the case of a liquid cooled detector this is, of course, not necessary as the cooling is by conduction from the extremely cold liquid and so in such a case the nature of the back of the mirror, that is to say its emissivity, is more or less immaterial.

While the present invention is not limited to any particular thickness of the infrared transparent layer on which the photodetectors are mounted, there is a consideration for the detector package as a whole. It must be sufficiently stiff so that it has the mechanical strength to maintain its alignment and to resist the forces encountered in ordinary use which can be quite severe in the case of satellites during their launching. This makes it impossible, or at least impractical, for the whole detector package to be extremely thin, as it would not then have sufficient mechanical strength to be practically useful. The preferred modification therefore utilizes an infrared transmitting layer sufficiently thick so that it has the required mechanical strength and a very thin mirror surface. Of course, the reverse can be used but is less desirable.

When an infrared transparent layer is of sufficient thickness to have the requisite mechanical strength there are only a few substances which are suitable. Pre-eminent among these substances is the diamond, and a diamond substrate with a mirror backing is the preferred embodiment of the present invention. The diamond is an excellent heat sink, having the highest diffusivity of any known substance, and has a high degree of transparency in the long wave infrared. It therefore constitutes the preferred embodiment of the present invention. In referring to an infrared transparent layer of considerable thickness to withstand the mechanical strains it should not be thought that this is a very thick layer; actually the diamond may be quite thin by ordinary industrial standards, for example ten or twenty mils in thickness. However, it should not be thinner than 100 microns because such a thin diamond plate is not produceable practically due to the brittleness of the substance.

The present invention is not limited to any particular photodetector, excellent results being obtainable however with lead selenide or indium antimonide. Lead selenide can be readily deposited on a diamond in a thin layer to produce a very sensitive detector. It should be noted that the diamond has one further advantage in that it is a good electrical insulator and so it is not necessary to provide any insulating layer between the detector and its transparent substrate layer. This is another reason for the preference for diamond as the transparent substrate.

Mention has been made of several preferred detectors, such as lead selenide, indium antimonide, but it should be understood that the invention is not limited thereto and where desirable other detectors such as doped semiconductors may be employed. Obviously, of course, the nature of the detector must be such that it can be practically mounted on a thin diamond substrate, but as many good photodetectors are capable of being mounted in the form of thin layers usually this does not present a serious practical problem.

The mirror surface back of the infrared transparent layer may be of anything desired. Thin layers of gold are very suitable but other mirror surfaces such as aluminum and the like may be employed. When the back of the mirror is blackened the usual materials which show high emissivity in the infrared are suitable, for example platinum black, certain black lacquers and the like.

The invention will be described in greater detail in conjunction with the drawings which show a typical use in a multichannel radiometer for satellites and a liquid cooled detector. Of course, even when radiation cooling is used the invention is not limited to satellite use and the radiative cooling may be employed wherever there is available an extended cold surface or cold body, for example ice covered regions of earth and the like. However, the advantages of the present invention in saving of power and weight are so much more important for satellite and other space use that this is the most important single field of utility of the present invention.

The invention will be described in greater detail in conjunction with the drawings in which:

FIG. 1 is a section through a radiometer;

FIG. 2 is an enlarged view of the detector package and its cooling; and

FIG. 3 is a section through a liquid cooled detector.

Only a portion of the radiometer is shown in FIG. 1 as the collecting optics are not significantly changed. They are therefore not shown in detail, but only the beam 1 produced therefrom. The beam passes through a chopper 2 of conventional design driven by a motor 3; it then passes through a filter 5 in a filter wheel or drum 4 which is turned successively to different filters by the stepping motor 8. The beam then passes through a doublet of silicon and germanium 6 and is reflected by the mirror 7 toward the detector package which can be seen best in FIG. 2.

The cooled detector package is mounted in a cone 14, the inner surface of which is mirrored. The mounting is on fibers 11. These fibers are attached to a diamond substrate 10 on which the detector itself, 15, for example lead selenide is deposited. On back of the diamond substrate there is a mirror surface 12 and a black surface 13.

For clarity these are shown exploded and, of course, the thickness of the mirror, the detector and the blackened surface are enormously exaggerated for clarity. These mirror surfaces are actually extemely thin.

The cooling of the detector will now be described. The detector receives very little direct radiation from the instrument as is the case with the part of the diamond substrate extending beyond the detector. In practice the diamond substrate is only a little larger than the detector. In a typical case the area of the detector may be only a few hundredths of a square centimeter and the diamond substrate about ten mils in thickness, and but little larger. Long wave radiation from $8\mu$ on, which is the range in which the maximum energy of radiation from the instrument is to be found, passes through the detector and through the diamond, encountering the mirror surface 12 and being reflected back into the instrument. As a result there is but little increase in temperature. The same is true of the heating from the bias current through the detector. Radiation from the black surface 13 to space is quite efficient and it is readily possible to obtain an equilibrium temperature of the detector package of about minus 100° C.

The filters 5 are quite narrow filters in the nearer infrared, for example from $1.6\mu$ to $3.8\mu$, and of course the very narrow spectral bands carry but little energy, for example when the radiometer is viewing a planet. However, the cooling of the detector enormously increases the sensitivity and it is quite adequate for even the extremely low level of radiation which the detector receives in each of the spectral bands as successive filters 5 are brought into the incoming beam. The detector is of course not swamped by the radiation from the instrument itself by reason of factors which have been described above.

FIG. 3 illustrates the use of the present invention for a liquid cooled detector. The detector, substrates and mirror bear the same reference numerals as in FIGS. 1 and 2. However, instead of the mirror back looking out into outer space it is mounted in heat exchanging relation with a very cold liquid 17 such as liquid nitrogen in the inner portion 16 of a Dewar flask the evacuated mantle of which is shown at 18. The other elements of the cryostat which maintain the liquified gas are not changed by the present invention and are, therefore, not shown. The same problems of radiation are encountered because the outer wall 19 of the Dewar flask is, of course, at a higher temperature, for example, 300° K. The transmission of infrared from the wall 19 through the substrate and its reflection from the mirror take place in exactly the same manner as they do in the detector of FIGS. 1 and 2 and the heating effect of these radiations is eliminated or reduced in the same manner.

The heat conduction of the cold liquid to the detector is, of course, much greater than the cooling through radiation in FIGS. 1 and 2 and, therefore, the need of the portion of the invention dealing with the substrate and mirror is less vital. Nevertheless it is useful and permits savings in cooling and obtaining a temperature very nearly equal to that of the liquid which is desirable.

The specific description has been in terms of a radiometer which investigates very narrow spectral bands. The invention of course is not limited to this type of radiometer and is useful wherever extreme sensitivity to very low level signals is required which necessitates a cooled detector.

In the specific description in connection with the drawings only the preferred modification has been described. There is a very real advantage in using a transparent substrate which does double duty as a rigid mechanical support for the detector. This is particularly important in radiation cooled modifications of the present invention for which the preferred modification is especially suited. When the invention is used for liquid cooled detector systems the greater cooling effect makes the ultimate in efficiency somewhat less important and particularly in such instruments other less preferred modifications of the invention find a useful place.

I claim:
1. A cooled photodetector comprising in combination,
   (a) a photodetector,
   (b) the photodetector being mounted on a substrate layer of infrared transparent material,
   (c) a mirror surface on the back of the infrared transparent layer,
   (d) means for cooling the mirror by radiation which comprises a surface of high infrared emissivity on the back of the mirror, and
   (e) means for shielding said surface of high emissivity from radiation at a temperature above that of the cooling means.
2. A radiation detector according to claim 1 in which the shielding means is an internally mirrored cone.
3. A radiation detector according to claim 2 in which the detector, transparent substrate layer, mirror and backing are thermally insulated from the mirrored shielding means.
4. A radiometer according to claim 3 in which the thermal insulation is by fiber suspension with fibers of low heat conductivity.
5. A detector according to claim 1 in which the infrared transparent layer is a diamond.
6. A detector according to claim 3 in which the infrared transparent layer is a diamond.
7. A detector according to claim 4 in which the infrared transparent layer is a diamond.
8. A detector according to claim 1 in which the photodetector is lead selenide.
9. A detector according to claim 5 in which the photodetector is lead selenide.
10. A detector according to claim 6 in which the photodetector is lead selenide.

References Cited by the Examiner
UNITED STATES PATENTS

| | | | |
|---|---|---|---|
| 618,704 | 1/1899 | Maxim | 252—502 |
| 2,544,261 | 3/1951 | Gibson | 338—18 |
| 2,742,550 | 4/1956 | Jenness | 250—83.3 |
| 2,994,053 | 7/1961 | De Waard | 250—83.3 |

RALPH G. NILSON, *Primary Examiner.*

JAMES W. LAWRENCE, *Examiner.*